I. D. FLANAGIN.
Whiffletree.
No. 50,347. Patented Oct. 10, 1865.
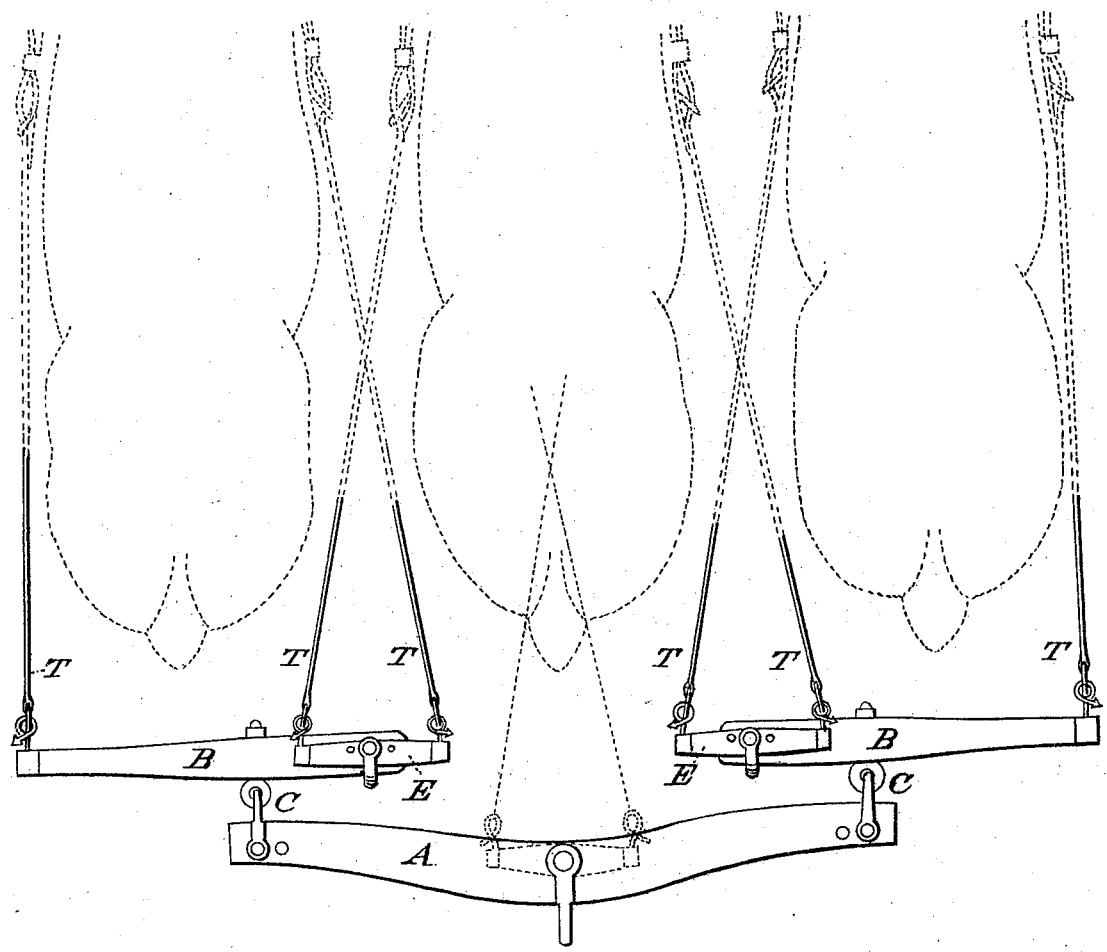
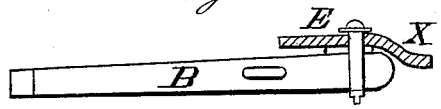
Witnesses:
Henry Drake
George Johnson
Inventor:
Isaac D. Flanagin

UNITED STATES PATENT OFFICE.

ISAAC D. FLANAGIN, OF CERESCO, MICHIGAN.

IMPROVED WHIFFLETREE.

Specification forming part of Letters Patent No. 50,347, dated October 10, 1865.

*To all whom it may concern:*

Be it known that I, ISAAC D. FLANAGIN, of the village of Ceresco, in the township of Marshall, county of Calhoun, and State of Michigan, have invented a new and useful Improvement in the Arrangement of Whiffletrees and Mode of Hitching to them; and I do hereby declare that the following is a full, clear, and exact description of the same, reference being had to the annexed drawings, making a part of this specification, in which—

Figure 1 is a plan view. Fig. 2 is a detail side elevation.

Similar letters of reference indicate corresponding parts in all of the figures.

This invention relates to an improved mode of arranging whiffletrees or equalizers and hitching to the same for ordinary use with vehicles or plowing or for other agricultural use, by which I claim to secure important advantages, but especially in plowing with a three-horse team, which is so deservedly in vogue among farmers at present.

To enable others to construct and use my invention, I will now proceed to describe the same, premising that as the general arrangements consist of well-known parts not requiring any special mode of construction I do not deem it necessary to give a very minute description of them or their relative proportions in detail, as these can readily be determined by the usual modes of calculation familiar to every aritizan.

Fig. 1 represents the arrangement for plowing with three horses.

The double-tree (shown at A) is constructed, ironed, and connected with the plow in the ordinary manner. An equalizing single or whiffle tree, B, is connected by means of the clasp-hook and eyebolt C to each end of the double-tree. Near the inner end of each of the whiffletrees B B a short equalizer, E, usually about one foot in length, is pivoted by an ordinary clasp and pivot-bolt. The tugs or traces are indicated at T. The outer traces of the nigh and off horses are hooked to the outer ends of the whiffletrees B B in the usual way, but their inner traces and those of the middle horse are hooked to the short equalizers E E in such manner that they cross each other. As this arrangement subjects the inner ends of the whiffletrees B B to a double strain they must be connected with the double-tree at such a point from their centers as to compensate by the unequal leverage for such additional strain.

I will say here that I make the short equalizers adjustable by extra bolt-holes or by any other of the well-known ways, so as to give the poor horse of the team the advantage of increased leverage. All the arrangements of whiffletrees known to me as hitherto in use for plowing with three horses abreast have this common defect, that the horses must be crowded together too closely; or, if they are spread apart with space to work properly in, then the double-tree is required to be of an inordinate length. Either condition causes the plow to run too much to land, which requires incessant twisting to counteract, and materially increases the labor of the plowman.

It will be seen that by crossing the traces to the short equalizers E E, I am enabled with an ordinary length of double-tree to give ample spread to the team, which effectually corrects any such tendency to run to land, and gives in addition superior facilities for equalizing the respective powers of the horses composing the team.

The crossing of the traces has not hitherto in practice produced any rubbing effect at all detrimental; but, if it should, I propose to substitute for the straight evener E in Fig. 1 one illustrated in Fig. 2, having its inner end bent down, as at $x$, over the rounded end of the whiffletree B, to be made of iron.

To adapt my arrangement to a two-horse team with the same double-tree, the whiffletrees B B and connecting-irons are removed, and one of the short equalizers E is pivoted in a suitable iron in the middle of the double-tree. The outer traces are hitched to hooks attached at the ends of the double-tree, and the inner traces are crossed and hooked to the short equalizer E as for three horses, and as exhibited by the dotted lines.

In the arrangement patented in 1864 by John Graham, of Ceresco, Michigan, where the outer traces are hitched to the double-tree ends as proposed by me for two horses, Mr. Graham, it is true, introduces a roller which is free to turn, and to which my short evener may be said to be a mere equivalent; but by my arrangement I accomplish entirely new and superior results in addition—viz., additional freedom to work between the horse's shoulders, the ability to divide the advantage to either horse on both sides of him, and the avoidance of the necessity of troublesome alterations in the lengths of the traces, or a special construction of the modified double-tree.

What I claim as my invention, and desire to secure by Letters Patent, is—

The employment of crossed traces connected to a short adjustable equalizer, E, when used in combination with the equalizing-whiffletrees B B and double-tree A, and constructed and arranged substantially as and for the purposes herein described and set forth.

ISAAC D. FLANAGIN.

Witnesses:
HENRY DRAKE,
GEORGE JOHNSON.